INVENTOR.
JOHN W. RUNNER

July 22, 1958     J. W. RUNNER     2,844,223
AUTOMATIC ADJUSTMENT GRIP FOR BRAKES Filed Aug. 1, 1955     2 Sheets-Sheet 2

INVENTOR.
JOHN W. RUNNER
BY
R. L. Miller
ATTORNEY

United States Patent Office 2,844,223
Patented July 22, 1958

2,844,223

AUTOMATIC ADJUSTMENT GRIP FOR BRAKES

John W. Runner, Akron, Ohio, assignor to The Goodyear Tire & Rubber Company, Akron, Ohio, a corporation of Ohio Application August 1, 1955, Serial No. 525,452

1 Claim. (Cl. 188—67)

This invention relates to brakes, and especially to a grip means for use on automatic adjustment pins provided in certain types of brakes, such as spot type airplane brakes.

Heretofore, there have been various patents granted upon automatic adjustment pins, or take up means in brakes for compensating for changes in the brake action and brake release position as wear occurs in the brake lining means of a brake. One of such construction is shown in Carl E. Bricker Patent Number 2,392,970 which shows a type of brake and adjustment means to which the present invention relates. However, insofar as I am aware, previous types of brakes have had relatively complex grip means provided in the automatic adjustment portion of the brake means. Such grip means have been difficult to produce commercially in large quantities and have accurate predeterminable gripping action from such grip means in different brake constructions. Specifically, some of the grip means have been various types of friction members carried in confining sleeves, or they have been of other specialized construction.

The general object of the present invention is to provide a new and improved type of a grip means for use in automatic adjustment pin constructions in brakes, which grip means is characterized by the fact that it is made from conventional commercial parts available in quantity with substantial equalization of properties and characteristics in the different parts.

Another object of the invention is to use an assembly of a plurality of standard split grip rings on a common longitudinally split carrier sleeve for engaging an automatic adjustment pin to provide a retarding grip action thereon.

Yet another object of the invention is to provide a friction grip of the class referred to made from a plurality of individual split rings so that the total grip force provided can be readily varied by adding to or subtracting from the number of grip rings positioned on a common carrier sleeve.

The foregoing and other objects and advantages of the invention will be made more apparent as the specification proceeds.

Reference now should be had to the accompanying drawings that show one currently preferred embodiment of the invention, and wherein.

When referring to corresponding parts shown in the drawings and described in the specification, corresponding numerals are used to facilitate comparison between such similar parts.

Figure 1:
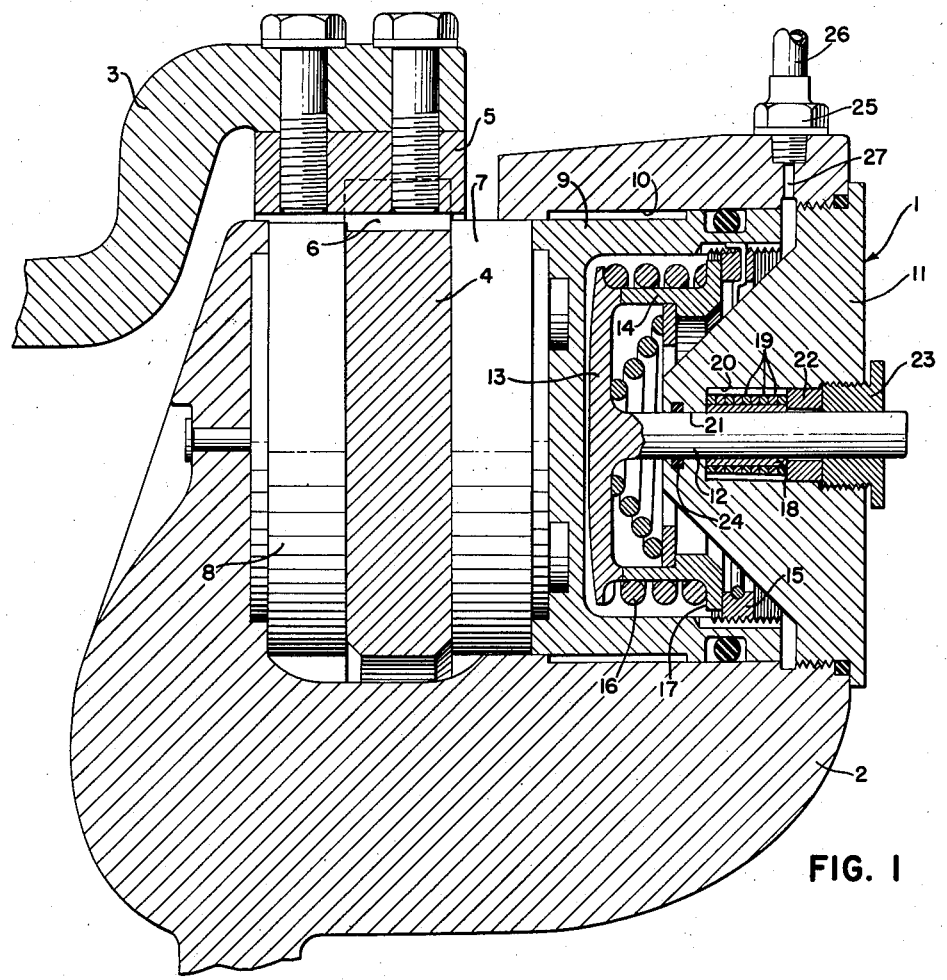
Fig. 1 is a fragmentary vertical section of a wheel and brake assembly wherein the brake embodies the principles of the invention.
Figure 3:
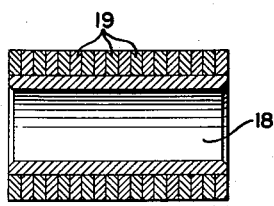
Fig. 3 is a longitudinal section taken on line 3—3 of Fig. 2.
Figure 2:
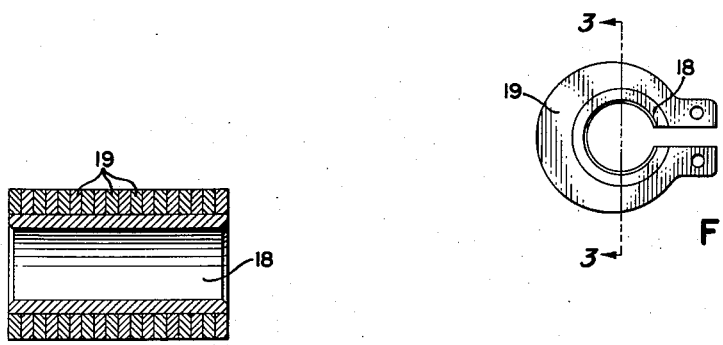
Fig. 2 is an enlarged end elevation of the friction grip means of Fig. 1.
Figure 4:
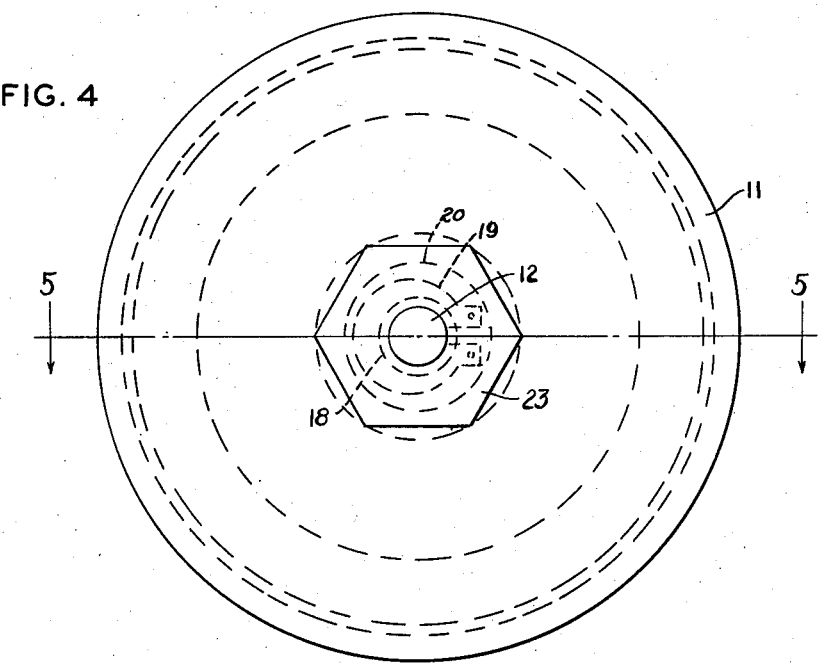
Fig. 4 is a view of the cylinder cap and adjustment pin mechanism as seen from the right of Fig. 1.
Figure 5:
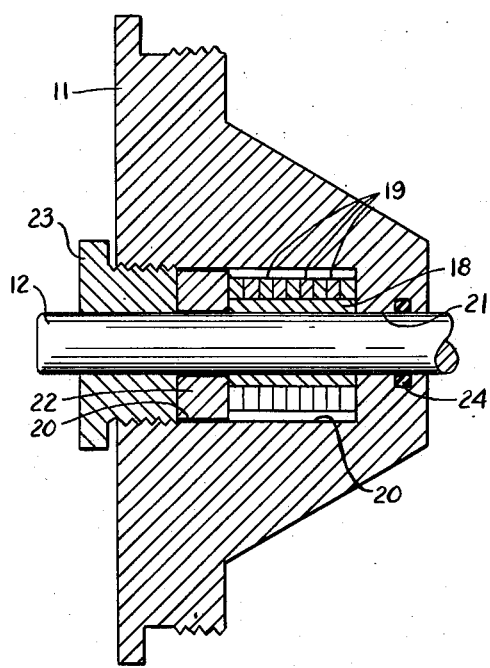
Fig. 5 is a cross sectional view taken on line 5—5 of Fig. 4.

The present invention in general relates to a brake having brake lining means carried by a brake piston received in a brake housing and having means for causing braking movement of such brake piston, and the novel elements of the brake comprise an automatic adjustment pin operatively connected to the brake piston, a longitudinally split carrier sleeve, a plurality of split rings in compressive engagement with the carrier sleeve to force it into frictional engagement with the automatic adjustment pin, and means for holding the carrier sleeve stationary in the brake construction. Thus the forces exerted upon the carrier sleeve can be varied readily by changing the number of split rings positioned thereon so that the retarding forces exerted on the automatic adjustment pin can be adjusted to a desired value for a given brake.

Now referring to the details of a construction shown in the enclosed drawings, the brake is indicated as a whole by the numeral 1. This brake 1 is positioned upon a conventional brake housing 2 that has a wheel 3 in operative association therewith. The wheel 3 engages a brake disc 4 by a plurality of keys 5 secured to the wheel 3 and engaging corresponding key slots 6 in the periphery of the brake disc 4. Conventional spot type brake lining discs 7 and 8 are positioned in opposed relation on opposite faces of the brake disc 4 by the brake housing 2. The brake disc 7 is suitably secured to a brake piston 9 slidably received in a brake cylinder 10 provided in the brake housing 2 and closed at its outer end by a cap member 11.

The brake 1 also includes, as an important element thereof, an automatic adjustment pin 12 which has an enlarged head 13 provided on the inner end thereof immediately adjacent the interior end of the brake piston 9. The brake piston 9 is operatively connected to the automatic adjustment pin 12 by conventional means which include a spacer sleeve 14 bearing against a positioning ring 15. The positioning ring 15 is secured to the brake piston 9. A coil spring 16 is based on a flange edge 17 of the spacer sleeve 14 and on the head 13 of the automatic adjustment pin 12 for providing operative clearance in the brake 1 by retraction of the brake piston 9 when the braking pressure exerted thereon is released, and limited movement of the brake piston 9 with relation to the automatic adjustment pin 12 is permitted.

As an important feature of the present invention, the friction grip means provided for engaging the automatic adjustment pin 12 include a longitudinally split carrier sleeve 18 having a plurality of circumferentially split rings 19 in compression engagement therewith. These rings 19 are of conventional construction and are chosen of a size as to exert a compressive action upon the longitudinally split carrier sleeve 18 which slidably engages the automatic adjustment pin 12. Thus by varying the number, or the size, or the shape (thickness) or physical characteristics of the split rings 19 in engagement with the carrier sleeve 18, the amount of frictional force between such carrier sleeve and the automatic adjustment pin can readily be varied. The carrier sleeve 18 and rings 19 are held in a stationary position in the brake 1 by being received in a counterbore 20 provided in a bore 21 that extends through the end cap 11 and in which the automatic adjustment pin 12 is positioned. Usually a spacer washer 22 is held against the assembly of the carrier sleeve 18 and the rings 19 by a lock nut 23 engaging the end cap 11.

The automatic adjustment pin 12 is sealed in the brake cylinder 10 by means of a conventional O-ring gasket 24.

Hydraulic fluid providing braking pressure upon the brake piston 9 is supplied by means of a fitting 25 secured to the brake housing 2 and to which a conduit 26 is connected, which conduit extends to conventional brake means, such as the master cylinder of a brake system for receiving fluid under pressure therefrom. The fitting 25 connects through a port 27 to the brake cylinder 10 for passing the brake fluid thereto.

Thus as wear on either of the brake discs 7 or 8 occurs, the friction grip means provided to permit the automatic adjustment pin 12 to move axially towards the brake disc 4 by the braking pressure applied to the brake piston 9 and by it to the automatic adjustment pin so that braking action can be effected. The coil spring 16 and associated means provide the desired operative clearance upon release of the hydraulic brake pressure applied to the brake piston 9.

From the foregoing, it will be seen that a novel type of an automatic adjustment pin and friction means therefore has been provided and that the frictional force exerted upon the automatic adjustment pin can be readily varied or controlled for different brake constructions. This friction grip means is made from conventional, durable components so that the objects of the invention are achieved.

While a certain representative embodiment and details have been shown for the purpose of illustrating the invention, it will be apparent to those skilled in this art that various changes and modifications may be made therein without departing from the spirit or scope of the invention.

What is claimed is:

The combination in an automatic adjustment grip for brakes of a cap having an axial bore and a counterbore, a pin extending through the counterbore and slidably received in the bore, a split sleeve in the counterbore and frictionally engaging the pin, a plurality of split rings frictionally engaging the sleeve to increase its friction on the pin, the rings having a smaller internal diameter before assembly than the external diameter of the sleeve after its assembly, said rings engaging each other side by side, a nut threadable into the end of the counterbore and slidably receiving the pin, and a spacer between the nut and the rings, said nut operating through the spacer to hold the sleeve against the end of the counterbore and to hold the rings between the spacer and the end of the counterbore.

References Cited in the file of this patent
UNITED STATES PATENTS

| | | |
|---|---|---|
| 1,473,188 | Kramp et al. | Nov. 6, 1923 |
| 1,664,062 | Cone | Mar. 27, 1928 |
| 2,551,252 | Du Bois | May 1, 1951 |
| 2,720,286 | Bricker | Oct. 11, 1955 |
| 2,762,461 | Naumann | Sept. 11, 1956 |
| 2,765,878 | Pierce | Oct. 9, 1956 |